United States Patent [19]

Kuno et al.

[11] Patent Number: 4,480,226
[45] Date of Patent: Oct. 30, 1984

[54] APPARATUS FOR INDICATING THE DIRECTION OF A VEHICLE WITH ABNORMAL FIELD SENSING CIRCUITS

[75] Inventors: Akira Kuno, Ohbu; Muneaki Matsumoto, Okazaki; Koji Numata, Toyokawa, all of Japan

[73] Assignee: Nippon Soken, Inc., Nishio, Japan

[21] Appl. No.: 184,615

[22] Filed: Sep. 5, 1980

[30] Foreign Application Priority Data

Sep. 12, 1979 [JP] Japan .......................... 54-126607[U]
Nov. 6, 1979 [JP] Japan .......................... 54-159561[U]
Mar. 12, 1980 [JP] Japan ............................ 55-32695[U]

[51] Int. Cl.³ .................... G01R 33/02; G01R 33/04; G01C 17/28
[52] U.S. Cl. .................................. 324/247; 324/253; 33/356; 33/361
[58] Field of Search ............... 324/244, 247, 253, 254, 324/255; 33/356, 357, 358, 361

[56] References Cited

U.S. PATENT DOCUMENTS

| | | | |
|---|---|---|---|
| 2,852,859 | 9/1958 | Depp | 324/244 |
| 3,696,518 | 10/1972 | Leat | 33/357 |
| 3,904,121 | 9/1975 | Takeda et al. | 324/247 |
| 4,262,427 | 4/1981 | Lynch et al. | 33/356 |
| 4,379,366 | 4/1983 | Kuno et al. | 33/361 |

Primary Examiner—Gerard R. Strecker
Assistant Examiner—Walter E. Snow
Attorney, Agent, or Firm—Cushman, Darby & Cushman

[57] ABSTRACT

A vehicle's heading indicating apparatus includes a direction-finding sensor having a pair of external field sensing windings wound perpendicular to each other, a sensor exciting oscillator circuit, a signal sampling timing circuit, sample-and-hold circuits, comparators, a logic circuit and an indicator circuit. The output of each of the sensor windings is divided into predetermined (N+1) signal levels such that the heading or direction of travel of a vehicle is detected and indicated in accordance with the combination of each two signal levels sensing the heading, and also large disturbance of the earth's magnetic field is sensed such that the just preceding direction of travel obtained is indicated when the earth's magnetic field is excessively low or high. The apparatus further comprises an abnormal field sensing circuit for generating an abnormal field signal upon detecting that the heading sensing signals from the direction-finding sensor have exceeded a predetermined range of levels and an indicator gives an abnormal field indication in response to the abnormal field signal.

12 Claims, 16 Drawing Figures

APPARATUS FOR INDICATING THE DIRECTION OF A VEHICLE WITH ABNORMAL FIELD SENSING CIRCUITS

BACKGROUND OF THE INVENTION

The present invention relates to improvements in and relating to heading indicating apparatus for vehicles of the type which indicates the heading or the direction of travel of a moving object such as a vehicle digitally or analogically in accordance with the output signals of a direction-finding sensor.

Known apparatus of the type in which the heading of a vehicle is detected and indicated by a direction-finding sensor such as is disclosed in Japanese Laid Open Patent Application No. 54-21889, includes two types, i.e., the analog type in which as disclosed in Japanese Laid Open patent application No. 54-28165, a pair of windings are wound to cross each other at right angles on a permanent magnet magnetized symmetrically with respect to a rotary shaft so that the output signals of a pair of output windings of a direction-finding sensor are respectively applied to the windings on the magnet and the permanent magnet is rotated thereby indicating the direction of the direction-finding sensor with respect to the earth's magnetic field or the direction of travel of the vehicle, and the digital type in which the direction-finding sensor includes N output windings wound on its magnetic core so as to divide it into 2N equal parts so that in accordance with the position of one of the output windings generating the highest or lowest output signal, the direction of travel of a vehicle is indicated digitally by one of the 2N headings or directions.

Of these prior art apparatus, the analog type is disadvantageous in that if the friction of the bearings on the rotary shaft of the permanent magnet is large, a large heading indication error will be caused and that it is difficult to position the apparatus normal to the line of vision of the driver as in the case of various automobile meters. The digital type of indicating the heading in accordance with one of the 2N headings is disadvantageous in that to increase the number of headings indicated, it is necessary to increase the number of the output windings of a direction-finding sensor, thus making it difficult to ensure reduced size and simplified manufacture of the direction-finding sensor.

SUMMARY OF THE INVENTION

With a view to overcoming the foregoing deficiencies in the prior art, it is an object of this invention to provide an improved heading indicating apparatus in which a direction-finding sensor includes a pair of output windings wound on a magnetic core to cross each other at right angles and the output from each of the output windings is divided into predetermined n+1 (N is a positive integer) signal levels, whereby the direction of the direction-finding sensor (with respect to) the earth's magnetic field or the direction of travel of a vehicle or the like is digitally indicated by a digital indicator in accordance with the combination of each two signal levels sensing the heading, thus making it possible to install the apparatus on the meter panel of a vehicle or the like and ensuring an improved visual confirmation or perception.

With the prior art apparatus of the type which senses the heading or the direction of travel of a vehicle or the like in accordance with the earth's magnetic field, it is impossible to obtain the proper heading at any place where the earth's magnetic field is disturbed considerably. As a result, where the earth's magnetic field is disturbed to a great extent, it is necessary to sense and indicate a heading which is close to the true vehicle's heading as far as possible.

It is therefore another object of this invention to provide an improved heading indicating apparatus in which where the output signals of the two output windings exceed limits determined by predetermined levels in any place where the earth's magnetic field is decreased or increased extra-ordinarily, the just preceding heading obtained is indicated so that even in a place where the earth's magnetic field is disturbed greatly, the heading is indicated which is close to the true or actual heading.

It is still another object of this invention to provide an improved heading indicating apparatus for vehicles including an abnormal field sensing circuit for generating an abnormal field signal upon detecting that the heading sensing signals from the direction-finding sensor have exceeded the range of predetermined levels due to an abnormality in the earth's magnetic field, and an abnormal field indication drive circuit responsive to the output signal of the abnormal field sensing circuit to actuate the indicator to indicate an abnormality in the earth's magnetic field, thus ensuring the indication of an abnormality in the earth's magnetic field as well as the indication of vehicle's heading.

DESCRIPTION OF THE PREFERRED EMBODIMENTS

Figure 1:
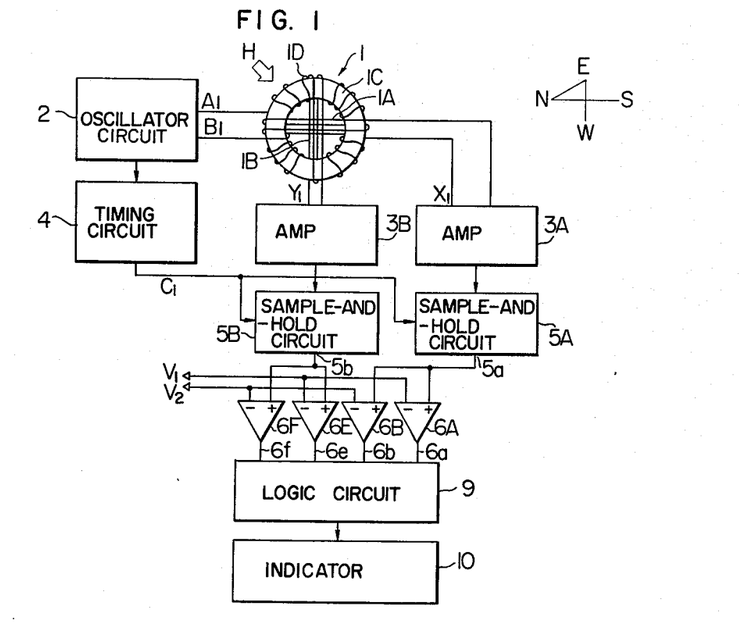
FIG. 1 is a block diagram showing the overall construction of a first embodiment of a heading indicating apparatus according to this invention.
Figure 2:
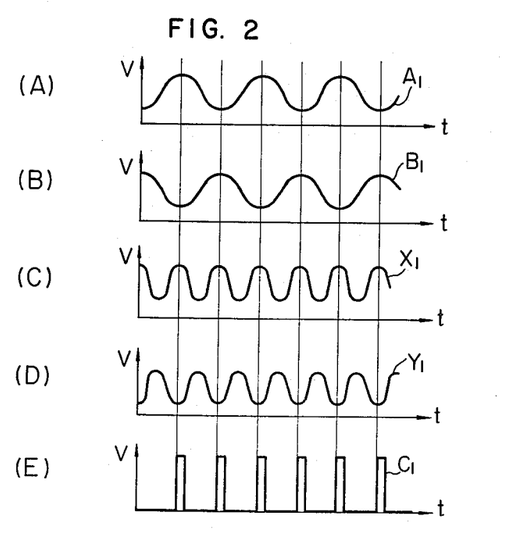
FIG. 2 shows a plurality of signal waveforms generated at various points in the heading indicating apparatus shown in FIG. 1.
Figure 3:
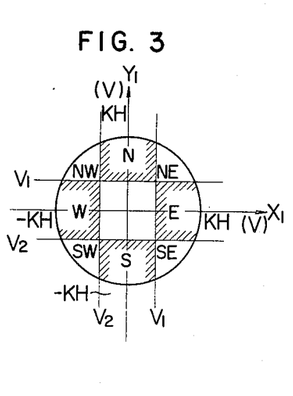
FIG. 3 is a diagram which is useful for explaining the operation of the embodiment shown in FIG. 1.

Referring first to FIG. 1 illustrating a first embodiment of a heading indicating apparatus according to the invention, a direction-finding sensor 1 including a magnetic core 1C of ferromagnetic material on which are wound an excitation winding 1D and output windings 1A and 1B which are wound to cross each other at right angles. Numeral 2 designates an oscillator circuit for generating symmetrical AC signals $A_1$ and $B_1$ ((A), (B) in FIG. 2) to exite the excitation winding 1D at a frequency f. The magnetic field in the core 1C varies with the strength H of the horizontal component of the earth's magnetic field and the resulting outputs Xhd 1 and $Y_1$ proportional thereto ((C), (D) in FIG. 2) are generated respectively from the output windings 1A and 1B. Since the outputs $X_1$ and $Y_1$ of the output windings 1A and 1B vary in dependence on the direction of the direction-finding sensor 1 or the direction of travel of a vehicle or the like, the outputs $X_1$ and $Y_1$ are respectively amplified by amplifier circuits 3A and 3B in such a manner that their maximum values become equal to each other and then they are respectively sampled and held by sample-and-hold circuits 5A and 5B in response to the signal $C_1$ ((E) in FIG. 2) from a timing circuit 4. Thus, the output voltages generated at points 5a and 5b respectively vary in proportion to the outputs $X_1$ and $Y_1$ of the direction-finding sensor 1. If the direction-finding sensor 1 is rotated through 360 degrees, the locus of the outputs at the points 5a and 5b describes circles having a magnitude (a radius kH (volt) with k being a constant) which is proportional to the strength H of the horizontal component of the earth's magnetic field as shown in FIG. 3. Considering a case where eight headings (N=2) are indicated digitally, each heading corresponds to 45 degrees and consequently predetermined comparison voltages $V_1$ and $V_2$ are given by the following equations.

$$V_1 = kH \sin 22.5° \doteq 0.3827\ kH\ (\text{volt})$$

$$V_2 = -kH \sin 22.5° \doteq -0.3827\ kH\ (\text{volt})$$

Thus, the amplified output signals of the output windings 1A and 1B are each divided into three signal levels. Referring again to FIG. 1, comparators 6A and 6B (Motorola MC 3302P) respectively compare the output of the sample-and-hold circuit 5A with the comparison voltages $V_1$ and $V_2$ and comparators 6E and 6F (Motorola MC 3302P) respectively compare the output of the sample-and-hold circuit 5B with the comparison voltages $V_1$ and $V_2$. The relationship between the resulting comparator outputs at points 6a, 6b, 6e and 6f and the directions of travel of a vehicle can be linearly determined as follows.

Chart 1

|   | X |   | 6e | 0 | 0 | 1 | 1 |
|---|---|---|----|---|---|---|---|
| 6a | 6b | 6f |    | 0 | 1 | 0 | 1 |
| 0 | 0 |   |    | SW | W |   | NW |
| 0 | 1 |   |    | S |   |   | N |
| 1 | 0 |   |    |   |   |   |   |
| 1 | 1 |   |    | SE | E |   | NE |

For instance, if the outputs 6a and 6b are both at a "1" level, the output 6e at a "0" level and 6f at the "1" level, the heading is east-ward or "E". A logic circuit 9 performs the logical operation on the outputs of the comparators 6A, 6B, 6E and 6F and the resulting direction of travel of the vehicle is digitally indicated by an indicator 10.

The operation of the first embodiment for the digital indication of eight headings has been described above, and it will be apparent that the digital indication of 4N headings (N=1, 2...) can be accomplished by comparing the outputs of the sample-and-hold circuits 5A and 5B with N predetermined voltage levels. The digital displays of the indicator 10 may for example be a fluorescent indicator panel, lamps or LEDs, and a symbolic indication may also be used.

It will thus be seen from the foregoing detailed description that since the outputs of the two output windings of the direction-finding sensor are each divided into (N+1) signal levels and the direction of travel of a vehicle or the like is digitally indicated in accordance with the combination of each two signal levels sensing the heading, the apparatus of the first embodiment is advantageous in that the number of headings to be indicated can be increased without any need to increase the number of output windings of a direction-finding sensor, that the apparatus can be mounted on the meter panel of a vehicle or the like without any need to consider the problem of mounting position as well as the problem of mechanical inconvenience as in the case of the prior art apparatus of the analog type and that the direction of travel of the vehicle can be indicated by a digital indicator capable of indicating 4N headings with improved visual perception.

Figure 4:
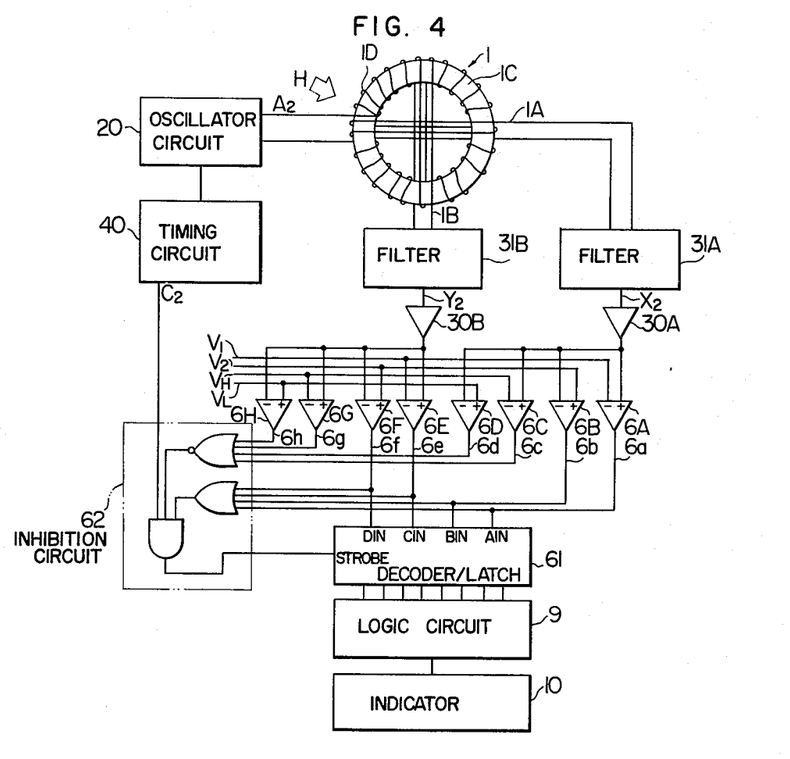
FIG. 4 is a block diagram showing the overall construction of a second embodiment of this invention.
Figure 5:
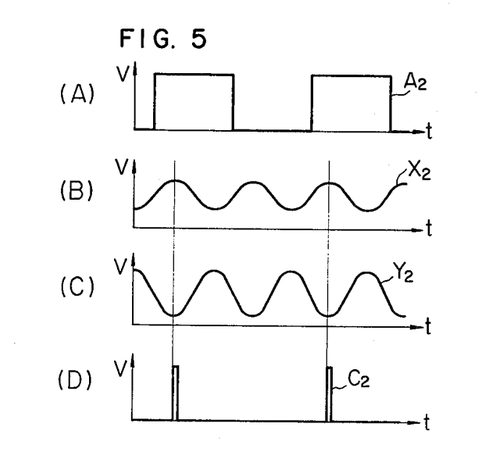
FIG. 5 shows a plurality of signal waveforms useful in explaining the operation of the second embodiment of FIG. 4.
Figure 6:
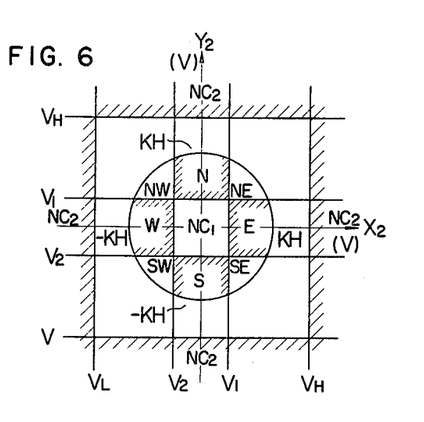
FIG. 6 is a diagram which is useful for explaining the operation of the second embodiment.

Next, a second embodiment of the heading indicating apparatus according to the invention which is so designed that at any place where the earth's magnetic field is disturbed the just preceding heading obtained will be indicated so as to reduce the difference between the indicated heading and the true heading, will be described. In FIG. 4 showing the second embodiment of the heading indicating apparatus according to the invention, the same reference numerals as used in FIG. 1 designate the same or equivalent component parts, and numeral 1 designates a direction-finding sensor including a ferromagnetic core 1C on which are wound an excitation winding 1D and output windings 1A and 1B crossing each other at right angles. Numeral 20 designates an oscillator circuit for generating a rectangular wave signal $A_2$ ((A) in FIG. 5) to excite the excitation winding 1D at a frequency f. The magnetic field in the magnetic core 1C varies in accordance with the strength H of the horizontal component of the earth's magnetic field so that the resulting outputs proportional to the variation are generated from the output windings 1A and 1B, and filters 31A and 31B respectively generate outputs $X_2$ and $Y_2$ ((B), (C) in FIG. 5) of frequency 2f component. The outputs $X_2$ and $Y_2$ vary with the direction of the direction-finding sensor 1 or the direction of travel of a vehicle or the like and consequently the outputs $X_2$ and $Y_2$ are adjusted respectively by amplifier circuits 30A and 30B so as to make their maximum values equal to each other. If it is predetermined so that the maximum values become equal to each other, the amplifier circuits 30A and 30B are not necessary. If the direction-finding sensor 1 is rotated in a parallel magnetic field through 360 degrees, in accordance with the timing of the signal $C_2$ ((D) in FIG. 5) from a timing circuit 40, the locus of the value of the outputs $X_2$ and $Y_2$ describes a circle of a magnitude (a radius kH (volt) with k being a constant) which is proportional to the strength H of the horizontal component of the earth's magnetic field (its value is dependent on each region and is substantially the same throughout the same region) as shown in FIG. 6. Where eight headings (N=2) are to be indicated digitally, each heading corresponds to 45 degrees and consequently predetermined comparison voltages $V_1$ and $V_2$ are given by $$V_1 = kH \sin 22.5° \doteq 0.3827 \, kH \text{ (volt)}.$$

$$V_2 = -kH \sin 22.5° \doteq -0.3827 \, kH \text{ (volt)}.$$

And the signals from the output windings 1A and 1B are each divided into three signal levels.

Where the earth's magnetic field is decreased under the effect of external influences, the locus of the value of the outputs $X_2$ and $Y_2$ is decreased, and where the earth's magnetic field is increased under the effect of external influences, the locus of the value of the outputs $X_2$ and $Y_2$ is increased. Since the comparison voltages $V_1$ and $V_2$ are determined and fixed for each region, if the earth's magnetic field is disturbed greatly, there is the possibility of the indicated direction of travel of the vehicle deviating greatly from the true heading. Comparison for determining whether the earth's magnetic field is excessively low is accomplished in accordance with the comparison voltages $V_1$ and $V_2$, and comparison for determining whether the earth's magnetic field is excessively high is accomplished in accordance with another comparison voltages $V_H$ and $V_L$. The comparison voltages $V_H$ and $V_L$ are preset as follows.

$$V_H = 1.5 \, kH \text{ (volt)}$$

$$V_L = -1.5 \, kH \text{ (volt)}$$

In FIG. 4, comparators 6A, 6B, 6C and 6D (Motorola MC 3302P) respectively compare the output $X_2$ with the comparison voltages, $V_1$, $V_2$, $V_H$ and $V_L$ and the similar comparators 6E, 6F, 6G and 6H respectively compare the output $Y_2$ with the comparison voltages $V_1$, $V_2$, $V_H$ and $V_L$. The relationship between the resulting comparator outputs 6a, 6b, 6c, 6d, 6e, 6f, 6g and 6h and the directions of travel of a vehicle or the like can be determined linearly as shown in the following Chart II.

Chart II

| | | | | | | | X | | | |
|---|---|---|---|---|---|---|---|---|---|---|
| | | | | | 6d | | 0 | | 0 | 1 |
| | | | | | 6c | | 0 | | 1 | 0 |
| | Y | | | 6b | 0 | 0 | 1 | | | |
| 6h | 6g | 6f | 6e | 6a | 0 | 1 | 0 | | | |
| 0 | 0 | 0 | 0 | | NCl | E | W | | | |
| | | 0 | 1 | | N | NE | NW | | | |
| | | 1 | 0 | | S | SE | SW | | | |
| 0 | 1 | | | | | | | NC2 | | |
| 1 | 0 | | | | | | | | | |

For instance, if the outputs 6a and 6b are both at the "0" level, the output 6e at the "1" level and the output 6f at the "0" level, the indication is that the heading is "N" (northward), and if the output 6a is at the "1" level, the output 6b at the "0" level, the output 6e at the "1" level and the output 6f at the "0" level, the heading is "NE"(-northeastward). The outputs of the comparators 6A, 6B, 6E and 6F are connected to a decoder/latch 61 (TOSHIBA TC 4514BP) so that when the outputs $X_2$ and $Y_2$ are in the normal regions (the regions other than the regions $NC_1$ and $NC_2$), the outputs of the comparators 6A, 6B, 6E and 6F are latched in response to the signal $C_2$ applied from the timing circuit 40 through an inhibition circuit 62 and the resulting decoded output is logically operated on by a logic circuit 9. The thus determined direction of travel of the vehicle is indicated digitally by an indicator 10.

When the earth's magnetic field is excessively low or when the outputs $X_2$ and $Y_2$ are in the region $NC_1$ as well as when the earth's magnetic field is excessively high or when the outputs $X_2$ and $Y_2$ are in the region $NC_2$, the inhibition circuit 62 performs the logical operation on its inputs so that the signal $C_2$ from the timing circuit 40 is prevented from being applied to the strobe terminal of the decoder/latch 61. As a result, the previously decoded output remains unchanged until the next signal $C_2$ is applied again to the strobe terminal and consequently the heading indicated just before the disturbance of the earth's magnetic field is indicated as the direction of travel of the vehicle until the earth's magnetic field returns to the normal condition.

The operation of the second embodiment for the digital indication of eight headings has been described, and it should be apparent that if 4N headings (N=1, 2 ---) are to be indicated digitally, by comparing the outputs of the amplifier circuits 30A and 30B with one of N predetermined voltage levels having the lowest absolute value and by comparing the outputs with predetermined voltage levels $V_H$ and $V_L$, it is possible to reduce the indication error or difference between the true heading and the direction of travel of the vehicle caused by a great disturbance of the earth's magnetic field. Further, while the excitation winding 1D is excited by the rectangular wave signal $A_2$ of a frequency f from the oscillator circuit 20, it is possible to use a sinusoidal signal for this purpose. The digital displays of the indicator 10 may comprise a fluorescent indicator panel, lamps, LEDs or the like, and a symbolic indication may also be used.

Figure 7:
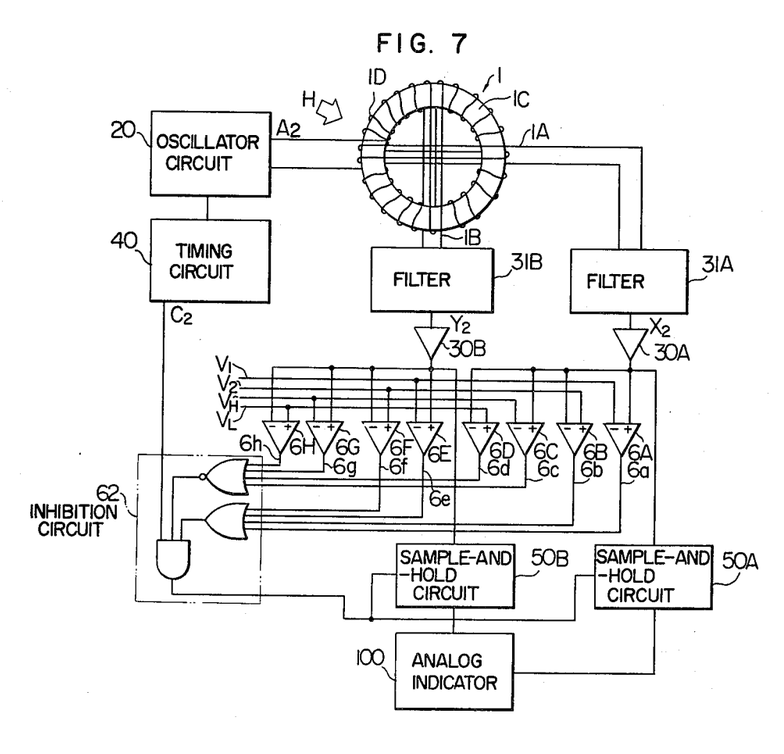
FIG. 7 is a block diagram showing the overall construction of a third embodiment of this invention.

FIG. 7 is a block diagram showing a third embodiment of the heading indicating apparatus according to the invention, which analogically indicates the direction of travel of a vehicle or the like instead of the digital indication of the second embodiment and in which the same component parts as used in the second embodiment are designated by the same reference numerals. In the Figure, numerals 50A and 50B designate sample-and-hold circuits for holding the outputs $X_2$ and $Y_2$ of the filters 31A and 31B in response to the signal $C_2$ from the timing circuit 40. Numeral 100 designates an analog indicator responsive to the outputs of the sample-and-hold circuits 50A and 50B so as to analogically indicate the direction of travel of the vehicle. Where the earth's magnetic field is disturbed considerably, as in the case of the second embodiment, the inhibition circuit 62 inhibits the signal $C_2$ from the timing circuit 40 so that the outputs of the sample-and-hold circuits 50A and 50B are maintained at the values obtained just before a large disturbance of the earth's magnetic field and thus the indicator 100 indicates the previously obtained direction of travel.

From the foregoing detailed description of the embodiments it will be seen that since the outputs of the output windings of the direction-finding sensor are each divided into predetermined (N+1) signal levels such that the direction of travel of a vehicle is detected and indicated in accordance with the combination of each two signal levels sensing the heading and since large disturbances in the earth's magnetic field are sensed such that the direction of travel obtained just before the disturbance is indicated when the earth's magnetic field is excessively low as well as when it is excessively high, there is a great advantage that the deviation of the indicated direction of travel from the true heading caused by any great disturbance of the earth's magnetic field is reduced. Next, a fourth embodiment of this invention which is designed so that when a vehicle comes to a place where the earth's magnetic field is disturbed considerably the disturbance is sensed so as to indicate that the indicated heading is not accurate, will be described with reference to FIG. 8. In the Figure, the same reference numerals as used in the previously described embodiments designate the same component parts. More specifically, a direction-finding sensor 1, an oscillator circuit 20, filters 310A and 310B (each comprising for example a capacitor and a resistor), amplifier circuits 30A and 30B, a timing circuit 40 and comparators 6A to 6H are identical or equivalent to the counterparts in the embodiment of FIG. 4 and they are connected in the same manner as in FIG. 4. As a result, the output signal ($A_2$) of the oscillator circuit 20, the output signals ($X_2$, $Y_2$) of the output windings 1A and 1B obtained through the filters, the output signal ($C_2$) of the timing circuit 40, the predetermined comparison voltages ($V_1$, $V_2$, $V_H$, $V_L$) and the comparator output signals become the same as those described in connection with the embodiment of FIG. 4 or shown in FIGS. 5 and 6.

Figure 8:
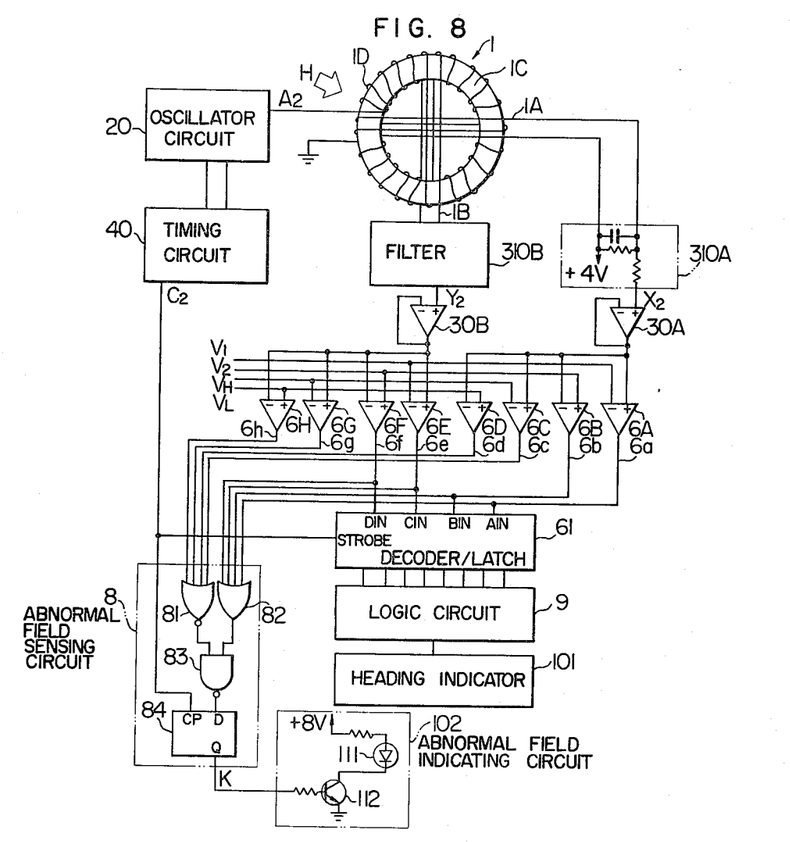
FIG. 8 is a block diagram showing the overall construction of a fourth embodiment of this invention.

As shown in the FIG. 8, the comparator outputs $6a$, $6b$, $6e$ and $6f$ are respectively coupled to the input terminals AIN, BIN, CIN and DIN of the decoder/latch 61 and they are also applied to an abnormal field sensing circuit 8. The output signal $C_2$ of the timing circuit 40 is applied to the strobe terminal of the decoder/latch 61. Also, in order to sense and memorize an abnormal condition of the earth's magnetic field, the comparator outputs $6a$, $6b$, $6e$ and $6f$ are applied to an OR gate 82 of the abnormal field sensing circuit 8 and the comparator outputs $6c$, $6d$, $6g$ and $6h$ are applied to a NOR gate 81 of the circuit 8. As a result, when the outputs $X_2$ and $Y_2$ are in the normal regions (i.e., the regions other than the regions $NC_1$ and $NC_2$ in the previously described signal chart II for the embodiment of FIG. 4), the outputs of the comparators 6A, 6B, 6E and 6F are latched in the decoder/latch 61 in response to the signal $C_2$ from the timing circuit 40 so that the resulting decoded output is logically operated on by a logic circuit 9 and the thus determined direction of travel of the vehicle is digitally indicated by a heading indicator 101.

When the earth's magnetic field is excessively low or when the outputs $X_2$ and $Y_2$ are in the region $NC_1$ as well as when the earth's magnetic field is excessively high or when the outputs $X_2$ and $Y_2$ are in the region $NC_2$, the OR gate 82, the NOR gate 81 and a NAND gate 83 of the abnormal field sensing circuit 8 perform the logical operation on their inputs and the sensed abnormal field condition is stored in a D-type flip-flop 84. When this occurs, the output signal K of the D-type flip-flop 84 changes from a "0" level signal indicative of the normal condition to a "1" level signal indicative of the abnormal condition. This "1" level signal is applied to an abnormal field indicating circuit 102 so that the signal turns on a transistor 112 forming an abnormal field indication drive circuit and the power is supplied from an 8-V supply terminal to a light-emitting diode 111 thus causing it to go on. This light-emitting diode 111 forms, along with the heading indicator 101, an indicating unit (shown in FIG. 12A) which is installed in the vehicle compartment and the lighting of the light-emitting diode 111 alerts the vehicle driver to the abnormal condition of the earth's magnetic field.

Figure 9:
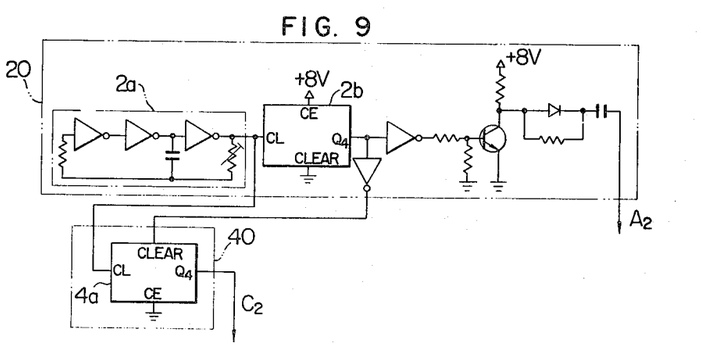
FIG. 9 is a wiring diagram showing in detail the construction of an oscillator circuit and timing circuit shown in FIG. 8.
Figure 10:
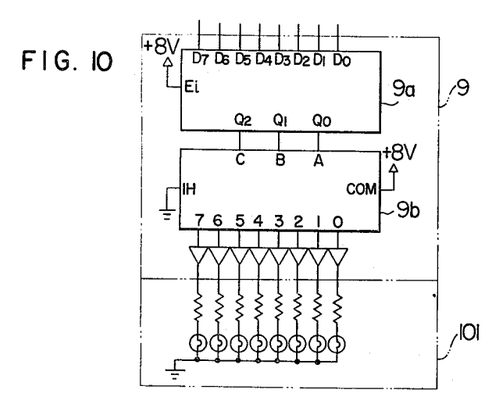
FIG. 10 is a wiring diagram showing in detail the construction of the logic circuit and the heading indicator shown in FIG. 8.

FIG. 9 shows in detail the circuit construction of the oscillator circuit 20 and the timing circuit 40 used in the previously described embodiments. In the oscillator circuit 20, numeral $2a$ designates a ring oscillator and $2b$ a counter (TOSHIBA TC 4520BP). The timing circuit 40 comprises a counter 1 decoder $4a$ (TOSHIBA TC 4017BP). FIG. 10 shows in detail the circuit construction of the logic circuit 9 and the heading indicator 101. In the logic circuit 9 of FIG. 10, numeral $9a$ designates an encoder (TOSHIBA TC 4532BP), and $9b$ a decoder (TOSHIBA TC 4051BP). And the component elements (1, 20, 30A, 30B, 310A, 310B, 40, 6A to 6H, 61, 8 and $9a$) are mounted on the ceiling of the vehicle and the other component elements ($9b$, 101, 102) are mounted on the instrument panel. The number of signal lines is reduced to 3 by virtue of the signal conversion effected by the encoder $9a$ and the decoder $9b$.

The operation of the fourth embodiment for the digital indication of eight headings has been described, and it will be apparent that if 4N (N=1, 2 --) headings are to be indicated digitally, by comparing the outputs of the amplifier circuits 30A and 30B with one of N predetermined voltage levels which has the lowest absolute value and by comparing the same outputs with predetermined voltages $V_H$ and $V_L$, it is possible to light the light-emitting diode 111 to indicate that the indicated direction of travel of a vehicle is inaccurate due to an abnormality of the earth's magnetic field and thereby to alert the driver of the vehicle to the fact. Also, while the excitation winding 1D is excited by the rectangular wave signal $A_2$ of a frequency f generated from the oscillator circuit 20, it is possible to use a sinusoidal signal for this purpose. Further, the digital displays of the heading indicator 101 may for example be comprised of a fluorescent indicator panel, lamps, LEDs or liquid crystals, and a symbolic indication may also be used.

Figure 11:
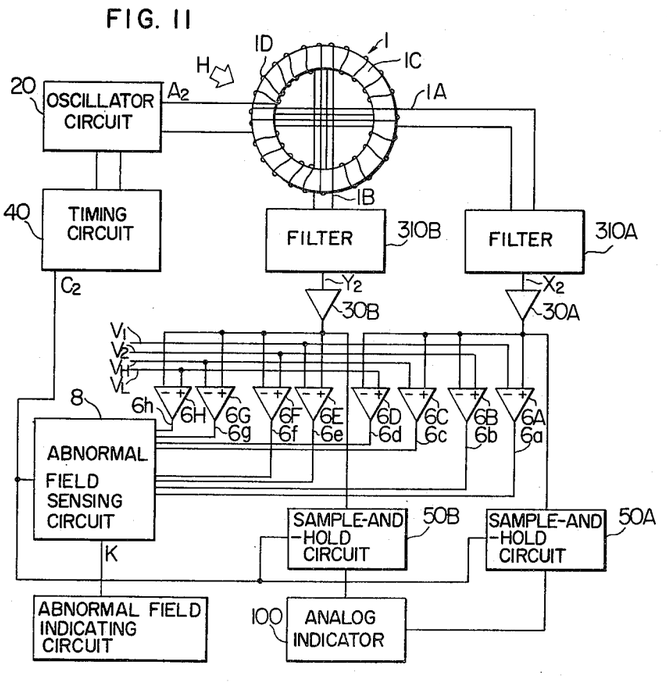
FIG. 11 is a block diagram showing the overall construction of a fifth embodiment of this invention.

FIG. 11 illustrates a block diagram for a fifth embodiment of the heading indicating apparatus for vehicles in accordance with this invention, which provides analog indication of the direction of travel of a vehicle in contrast to the digital indication of the direction of travel provided by the fourth embodiment and in which the component parts identical with the counterparts of the fourth embodiment are designated by the same reference numerals. In the Figure, numerals 50A and 50B designate sample-and-hold circuits for holding the outputs $X_2$ and $Y_2$ of the filters 31A and 31B in response to the signal $C_2$ from the timing circuit 40. Numeral 100 designates an analog heading indicator responsive to the outputs of the sample-and-hold circuits 50A and 50B so as to analogically indicate the direction of travel of a vehicle by means of the needle (shown in FIG. 12D). Where the earth's magnetic field is disturbed considerably, in the same manner as the fourth embodiment, the disturbance is sensed and memorized by the abnormal field sensing circuit 8 and thus the light-emitting diode 111 of the abnormal field indicating circuit 102 is lighted.

While, in the above-described fourth and fifth embodiments, the light-emitting diode 111 of the abnormal field indicating circuit 102 is lighted when an abnormality of the earth's magnetic field is sensed and memorized, the lighting or flashing of any other indicator may also be used. Further, with the fourth embodiment, it is possible to use an abnormal field indicating method so designed that within the scope of heading indication by the heading indicator 101 the indicated heading may be flashed on and off, turned off, decreased in brightness or changed in color, and another abnormal field indicating method may also be used which causes all the heading indications to flash on and off, go off, decrease in brightness or change in color. In the case of the fifth embodiment, it is also possible to use still another method of indicating the abnormality through for example the rotation of the needle of the analog heading indicator 100.

Figure 12A:
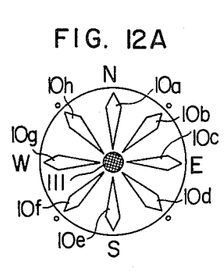
FIGS. 12A to 12E are schematic diagrams showing examples of heading indication by the heading indicators.
Figure 12B:
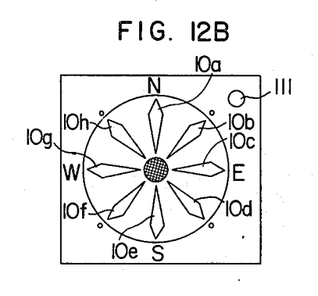
Figure 12C:
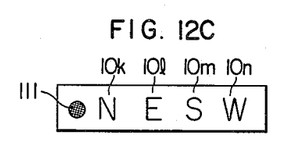
Figure 12D:
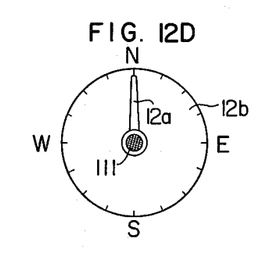
Figure 12E:
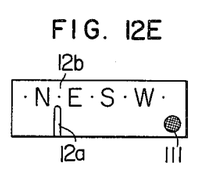

Next, examples of the abnormal field indication by means of the indicators 100 and 101 and the light-emitting diode 111 will be described with reference to FIGS. 12A to 12E. FIGS. 12A to 12C show examples of an abnormal field indication by means of the digital heading indicator 101 and the light-emitting diode 111, and FIGS. 12D and 12E show examples of an abnormal field indication by means of the analog heading indicator 100 and the light-emitting diode 111. Referring first to FIGS. 12A and 12B, numerals 10a to 10h designate display pieces for indicating eight directions of travel such that only that piece corresponding to the detected direction of travel is lighted, and numeral 111 designates the light-emitting diode shown in FIG. 8. In FIG. 12C, numerals 10k to 10n designate symbolic displays for indicating directions of vehicle's travel such that the displays 10k and 10l are turned on simultaneously and the others are turned off when the direction of travel is NE or northeastward, only the display 10m is turned on and the others are turned off when the direction is S or southward and so on. The light-emitting diode 111 is lighted upon detecting an abnormality of the earth's magnetic field. In FIGS. 12D and 12E, numeral 12a designates an indicating needle, and 12b a panel. The needle 12a is moved in response to the direction of travel of the vehicle to indicate the direction, and the light-emitting diode 111 is operated in the same manner as in the above-mentioned examples.

It will thus be seen from the foregoing description that in accordance with the present invention, by virtue of the fact that the direction of travel of a vehicle is indicated in accordance with the heading sensing signals from a direction-finding sensor adapted to sense the direction of travel of a vehicle by utilizing the effect of the earth's magnetic field and that an abnormal field indication drive circuit causes the indicating means to indicate abnormality of the earth's magentic field when an abnormal field sensing circuit senses that the heading sensing signals have exceeded a predetermined range of levels due to an abnormality of the earth's magnetic field, there is a great advantage that the indication of the indicating means can simultaneously provide the desired heading information and the information indicative of the normal or abnormal condition of the earth's magnetic field, with the result that it is possible to prevent any erroneous judgement of the vehicle's heading by the indication of the indicating means due to an abnormality of the earth's magnetic field and moreover it is possible through the indication of the earth's magnetic field abnormality to alert visually the driver of the vehicle to the abnormal condition of the earth's magnetic field in good time without requiring any extra attention on the part of the vehicle driver.

We claim:

1. In a heading indicating apparatus for vehicles including direction-finding sensor means having a magnetic core, an excitation winding wound on said core and a pair of output windings wound to cross each other at right angles on said core for generating heading indicating output signals in response to terrestrial magnetism, the improvement comprising:

means for classifying the output signal generated from each of said output windings into predetermined (N+1) signal level regions to generate classifying signals;

means for indicating one of 4N headings indicative of the direction of said sensor in response to the respective classifying signals;

and means for maintaining a just preceding heading indication when the level of said output signals generated from said sensor output windings get into predetermined abnormal signal level regions under the effect of disturbance of the earth's magnetic field.

2. An apparatus according to claim 1, wherein said sensor means includes a rectangular wave oscillator circuit for exciting said sensor excitation winding, a timing circuit for generating a timing signal in synchronism with said oscillator circuit, means for filtering and amplifying the output signals of said sensor output windings, said classifying means includes first comparison means for comparing said amplified output signals with first and second reference voltages for the purpose of sensing normality of the earth's magnetic field; and said maintaining means includes second comparison means for comparing said amplified output signals with third and fourth reference voltages for the purpose of sensing abnormalities of the earth's magnetic field, a decoder/latch circuit responsive to comparison outputs of said first comparison means resulting from the comparison between said amplified outputs and said first and second reference voltages and said timing signal to generate a decoded signal, an inhibition circuit responsive to all outputs of said first and second comparison means so as to sense disturbance of the earth's magnetic field and thereby to prevent application of said timing signal to said decoder/latch circuit, and logic means responsive to said decoded signal, the abnormality of an abnormally small terrestrial magnetism being sensed in response to the first comparison output signals generated responsive to the heading indicating output signal levels below the predetermined N signal levels, and the abnormality of an abnormally large terrestrial magnetism being sensed in response to the second comparison output signals generated responsive to the heading indicating output signal levels above said predetermined abnormal signal levels.

3. An apapratus according to claim 1, wherein said sensor means includes a rectangular wave oscillator circuit for exciting said sensor excitation winding, a timing circuit for generating a timing signal in synchronism with said oscillator circuit, means for filtering and amplifying output signals of said sensor output windings, said classifying means includes first comparison means for comparing said amplified output signals with first and second reference voltages for normal earth's magnetic field sensing purposes; and said maintaining means includes second comparison means for comparing said amplified output signals with third and fourth reference voltages for abnormal earth's magnetic field sensing purposs, hold circuit means for holding said amplified output signals in response to said timing signal, an inhibition circuit responsive to all outputs of said first and second comparison means so as to sense disturbance of the earth's magnetic field and thereby to prevent application of said timing signal to said hold circuit means, and analog indicator means for indicating said signals, the abnormality of an abnormally small terrestrial magnetism being sensed in response to the first comparison output signals generated responsive to the heading indicating output signal levels below the predetermined N signal levels, and the abnormality of an abnormally large terrestrial magnetism being sensed in response to the second comparison output signals generated responsive to the heading indicating output signal levels above said predetermined abnormal signal levels.

4. A heading indicating apparatus for a vehicle, comprising:
heading-finding sense means for detecting terrestrial magnetism to generate heading indicating output signals substantially in response to mutually perpendiular components of the magnetism;
first compare means for comparing the heading indicating output signal levels with predetermined N (an optional integer) signal levels to generate first comparison output signals respectively; and
indication means including means for periodically holding the first comparison output signals and means for indicating one of 4N headings in response to the held output signals;
second compare means for comparing the heading indicating output signal levels with predetermined abnormal signal levels to generate second comparison output signals respectively; and
means for sensing an abnormality in the terrestrial magnetisum and controlling said indicating means in response to predetermined values of either of said first and second comparison output signals,
the abnormality of an abnormally small terrestrial magnetism being sensed in response to the first comparison output signals generated responsive to the heading indicating output signal levels below the predetermined N signal levels, and the abnormality of an abnormally large terrestrial magnetism being sensed in response to the second comparison output signals generated responsive to the heading indicating output signal levels above said predetermined abnormal signal levels.

5. An apparatus according to claim 4, wherein said sensing and controlling means comprises means for maintaining a just preceding heading indication of said indicating means.

6. An apparatus according to claim 4, wherein said indication means includes means for indicating the generation of the abnormality in response to said sensing and control means.

7. An apparatus according to claim 5, wherein said indication means include analog indication means.

8. An apparatus according to claim 6, wherein said indication means include analog indication means.

9. An apparatus according to claim 5, wherein said indication means include digital indication means.

10. An apparatus according to claim 6, wherein said indication means include digital indication means.

11. A heading indicating apparatus for a vehicle, comprising direction-finding sensor means for periodically detecting terrestrial magnetisum to generate heading indicating output signals substantially in response to mutually perpendicular components of the magnetism;
first compare means for comparing the generate output signal level with predetermined N (an optional integer) signal levels to generate first binary output signals corresponding to the respective signal-level relations;
means for holding the first binary output signals in synchronism with the periodic detection of the terrestrial magnetism;
means for indicating one of 4N headings in response to the held binary output signals;
second compare means for comparing the heading indicating output signal levels with predetermined abnormal signal levels to generate second binary output signals corresponding to the respective signal-level relations; and means for discriminating presence or absence of any one of predetermined abnormal combinations of current first and second binary output signals, allowing said holding means to hold the current first binary output signals in the absence of said any one abnormal combination and causing said holding means to continuously hold just preceding first binary output signals without holding the current first binary output signals in the presence of said any one abnormal combination whereby said indicating means maintains a just preceding heading indication.

12. A heading indicating apparatus for a vehicle, comprising direction-finding sensor means for periodically detecting terrestrial magnetism to generate heading indicating output signals substantially in response to mutually perpendicular components of the magnetism;
first compare means for comparing the generated output signal levels with predetermined N (an optional integer) signal levels to generate first binary output signals corresponding to the respective signal-level relations;
means for holding the first binary output signals in synchronism with the periodic detection of the terrestrial magnetism;
means for indicating one of 4N headings in response to the held binary output signals;
second compare means for comparing the heading indicating output signal levels with predetermined abnormal signal levels to generate second binary outputs signals corresponding to the respective signal-level relations;
means for sensing an abnormality in the terrestrial magnetism and generating an abnormality indicating signal in response to predetermined magnitudes of either of said first and second binary output signals; and
means for indicating the generation of the abnormality in the magnetism in response to the abnormality indicating signal,
the abnormality of an abnormally small terrestrial magnetism being sensed in response to the first comparison output signals generated responsive to the heading indicating output signal levels below the predetermined N signal levels, and the abnormality of an abnormally large terrestrial magnetism being sensed in response to the second comparison output signals generated responsive to the heading indicating output signal levels above said predetermined abnormal signal levels.

* * * * *

UNITED STATES PATENT AND TRADEMARK OFFICE
CERTIFICATE OF CORRECTION

PATENT NO. : 4,480,226

DATED : October 30, 1984

INVENTOR(S) : Akira KUNO: Muneaki MATSUMOTO & Koji NUMATA

It is certified that error appears in the above-identified patent and that said Letters Patent is hereby corrected as shown below:

On the Title Page in the Heading:

In the second line of Item [30] read:

"Nov. 6, 1979 [JP] Japan.....54-159561[U] as

--Nov. 16, 1979 [JP] Japan.....54-159561[U]--

Signed and Sealed this

Second Day of July 1985

[SEAL]

Attest:

DONALD J. QUIGG

*Attesting Officer*    *Acting Commissioner of Patents and Trademarks*